United States Patent
Przygienda

(10) Patent No.: US 6,587,475 B1
(45) Date of Patent: Jul. 1, 2003

(54) METHOD OF ASSIGNING CIRCUIT ID'S IN AN IS-IS COMPLIANT NETWORK

(75) Inventor: Antoni Bronislaw Przygienda, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/148,657

(22) Filed: Sep. 4, 1998

(51) Int. Cl.⁷ .................................................. H04J 3/16
(52) U.S. Cl. ........................ 370/465; 370/400; 709/239
(58) Field of Search ................................. 370/464, 465, 370/466, 351, 352, 401, 400, 402, 392, 389, 229, 238, 397, 394, 355, 254, 256, 235; 710/15, 18, 19; 709/220, 224, 239

(56) References Cited

U.S. PATENT DOCUMENTS

| | | | | |
|---|---|---|---|---|
| 5,251,205 A | * | 10/1993 | Callon | 370/392 |
| 5,430,727 A | * | 7/1995 | Callon | 370/401 |
| 5,633,866 A | * | 5/1997 | Callon | 370/397 |
| 5,699,347 A | * | 12/1997 | Callon | 370/238 |
| 5,719,861 A | * | 2/1998 | Okanoue | 370/351 |
| 5,742,820 A | * | 4/1998 | Perlman | 709/249 |
| 5,825,772 A | * | 10/1998 | Dobbins | 370/396 |
| 5,854,899 A | * | 12/1998 | Callon | 370/235 |
| 5,987,521 A | * | 11/1999 | Arrowood | 709/239 |
| 6,151,324 A | * | 11/2000 | Belser | 370/397 |
| 6,256,295 B1 | * | 7/2001 | Callon | 370/254 |

* cited by examiner

*Primary Examiner*—Dang Ton
*Assistant Examiner*—Ricardo M. Pizarro
(74) *Attorney, Agent, or Firm*—Barry H. Freedman

(57) ABSTRACT

The number of possible circuits that can be linked to each node operating in accordance with the IS-IS standard is expanded from the 256 limit set by the IS-IS standard to a larger arbitrary number. Each node is initially assigned and can use on each circuit a pseudonode ID containing any arbitrary, non-zero circuit ID. This status continues until it is determined that the said node is to become DIS on this LAN; if that happens, the arbitrary circuit ID is abandoned, and the system itself is allowed (using the IS-IS standard process) to reassign a pseudonode ID containing a circuit ID that is indeed unique on the LAN and therefore unused. If the said node has not been determined as DIS on the LAN, it continues to use the arbitrarily assigned circuit ID.

3 Claims, 3 Drawing Sheets

FIG. 3

| | NO. OF OCTETS |
|---|---|
| INTRADOMAIN ROUTING PROTOCOL DISCRIMINATOR | 1 |
| LENGTH INDICATOR | 1 |
| VERSION/PROTOCOL ID EXT | 1 |
| RESERVED | 1 |
| R \| R \| R \| TYPE | 1 |
| VERSION | 1 |
| ECO | 1 |
| USER ECO | 1 |
| RESERVED/CIRCUIT TYPE | 1 |
| SOURCE ID | 6 |
| HOLDING TIMER | 2 |
| PDU LENGTH | 2 |
| R \| PRIORITY | 1 |
| LAN ID | 7 |
| VARIABLE LENGTH FIELDS | VARIABLE |

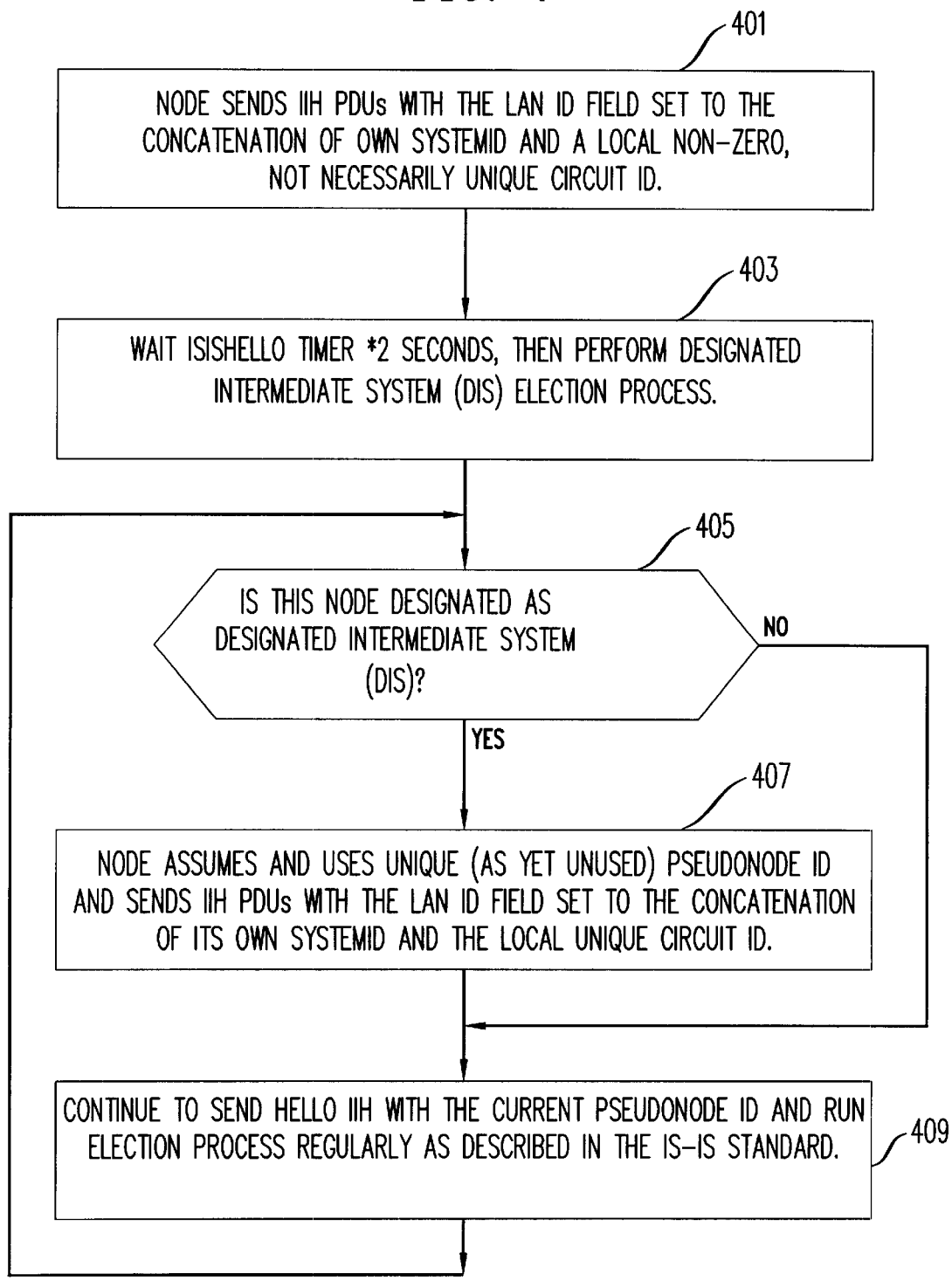

METHOD OF ASSIGNING CIRCUIT ID'S IN
AN IS-IS COMPLIANT NETWORK

FIELD OF THE INVENTION

This invention relates to digital packet communications in a network of nodes, and, in particular, to a method used in the nodes of assigning circuit ID's to circuits in a manner that allows compliance with existing standards (in particular, the IS-IS standard) while at the same time avoiding the existing restriction of establishing no more than 256 circuits.

BACKGROUND OF THE INVENTION

IS-IS is a standard technique used today by many internet service providers (ISPs) for routing message packets among interconnected Intermediate Systems (IS) nodes (typically routers) in a communications network. The IS-IS standard is described in R. Callon, *OSI ISIS Intradomain Routing Protocol*, INTERNET-RFC, Internet Engineering Task Force, February 1990; R. Callon, *Use of OSI ISIS for Routing in TCP/IP and Dual Environments*, INTERNET-RFC, Internet Engineering Task Force, December 1990; and ISO, *Information Technology—Telecommunications and Information Exchange between Systems—Intermediate System to Intermediate System Routing Exchange Protocol for Use in Conjunction with the Protocol for Providing the Connectionless-Mode Network Service*, 1990.

The IS-IS standard, when used in the environment of multicasting or message broadcast from one point to many points, has the unfortunate restriction of supporting no more than 256 circuits (i.e., interfaces to other nodes) per IS node, and requiring each circuit to reserve a unique circuit identifier from the range between 0 and 255. Extending the IS-IS protocol to support more than 256 circuits would be very desirable, since ISPs are building networks containing more and more nodes. Note that the problem just described applies only in the broadcast environment; in the case of point to point (P2P) circuits, the IS-IS protocol specification can be violated without consequences, by permitting the use of non-unique circuit identifier values, so that the 256 circuit limitation is not a problem in that environment.

SUMMARY OF THE INVENTION

In accordance with the present invention, the number of possible circuits that can be linked to each Intermediate Systems (IS) node in a local area network (LAN) is expanded from the 256 limit set by the IS-IS standard to a larger arbitrary number. The only limitation, in accordance with the present invention, is that there can be at most 255 circuits on which a given node is a pseudonode (i.e., a node on the LAN that represents the LAN) instantiated by a node that is chosen to be a "Designated Intermediate System" (DIS), but this limitation is unlikely to be reached in any practical network environment that is contemplated today.

The strategy of the present invention is to avoid the 255 circuit limitation imposed by the IS-IS standard by initially allowing some ambiguity, and then sacrificing a small amount of additional processing time that is needed to resolve ambiguities that turn out to be problematic. In accordance with the method of the present invention, each node is initially assigned and can use a pseudonode ID containing any arbitrary, non-zero circuit ID. This status continues until it is determined that the said node is to become a pseudonode when the node becomes a DIS on this LAN; if that happens, the arbitrary circuit ID is abandoned, and the system itself is allowed (using the IS-IS standard process) to reassign a pseudonode ID containing a circuit ID that is indeed unique on the LAN and therefore unused. If the said node has not been determined as DIS on the LAN, it continues to use the arbitrarily assigned circuit ID.

BRIEF DESCRIPTION OF THE DRAWINGS

The present invention will be more fully appreciated by consideration of the following Detailed Description, which should be read in light of the accompanying drawing in which:

FIG. 3 illustrates the format of the "hello" packets that are exchanged when a circuit is established between a pseudonode and other nodes on the network;

and

FIG. 4 is a flow diagram illustrating the process by which a pseudonode ID is assigned in accordance with the present invention.

DETAILED DESCRIPTION OF THE INVENTION

In order to better understand the environment in which the present invention operates, several definitions will be useful:

System ID is a unique Source ID, usually 6 bytes, with an additional 1 byte appended to indicate the type of node. In case of a physical node, the additional byte is a 0 byte, while in the case of a pseudonode (defined below), the additional byte is a unique circuit id. Such a System ID represents the pseudonode and is called a "pseudonode ID".

Pseudonode: Consider a broadcast subnetwork containing n connected Intermediate Systems (IS) nodes. If the n nodes are fully connected, each node has (n−1) connections to other nodes, and the entire network has n*(n−1)/2 connections. A pseudonode is a node that has only a single link to each of the n Intermediate Systems (IS) nodes. Each of the IS nodes can communicate with each other via the pseudonode, and the entire broadcast subnetwork has n connections rather than n*(n−1)/2 connections as in a fully connected network. Note that, as explained below, when a node becomes DIS, the DIS creates an instance of the node that is a pseudonode.

Figure 1:
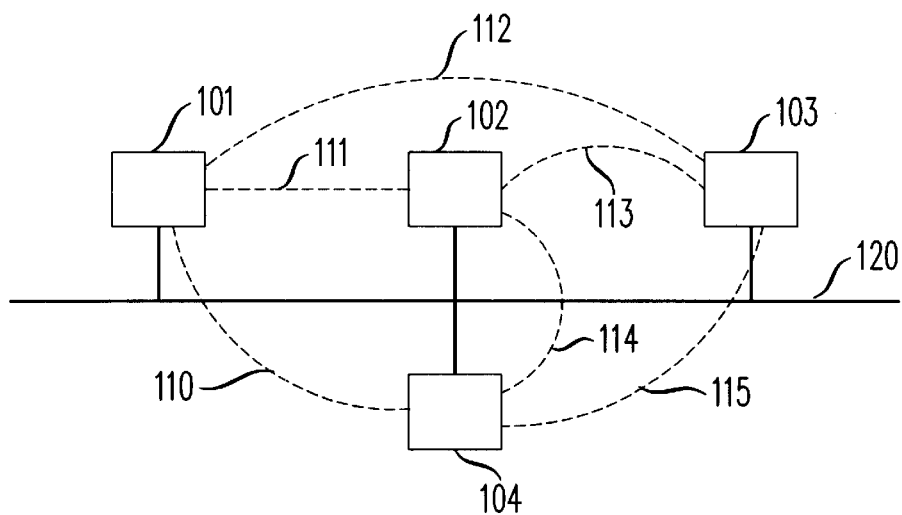
FIGS. 1 and 2 illustrate the concept of pseudonodes.
Figure 2:
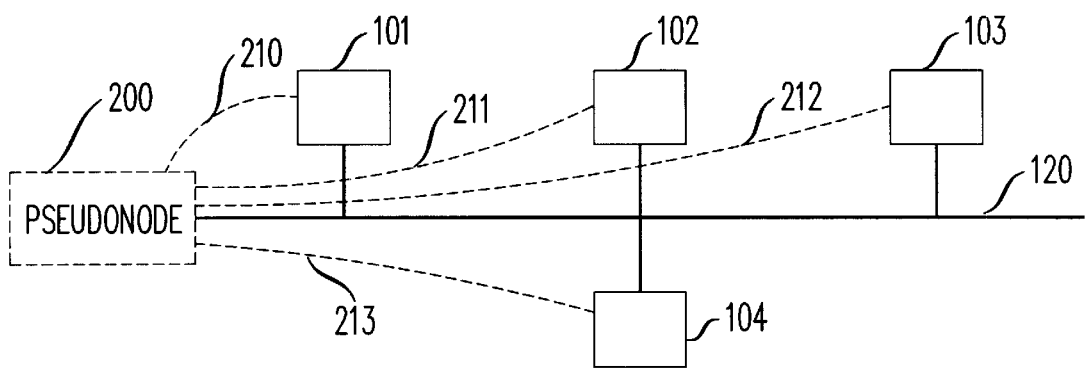

The concept of pseudonodes is illustrated in FIGS. 1 and 2. In FIG. 1, a network of four nodes 101–104 is shown, with the nodes physically connected to a bus 120. For the purpose of communications, each node is connected to each of the other nodes directly, via six (4*3/2) circuits designated 110–115. In FIG. 2, the same nodes 101–104 and bus 120 are shown. Here, a pseudonode 200 is connected only once to each of the nodes 101–104. There are a total of four circuits 210–213 directly connecting the nodes 101–104 to the pseudonode 200.

Designated Intermediate System (DIS) is one of the Intermediate Systems on a LAN that incorporates a pseudonode representing the LAN. DIS is chosen by the means of an election when IS nodes are discovering each other.

Link State protocol data units (PDUs) are pieces of information shared amongst the nodes that describe the state of each node's links. PDUs are generated on behalf of the pseudonode by the DIS.

In accordance with the IS-IS standard, a pseudonode must be identified by a pseudonode ID, which consists of the source ID of the DIS, followed by a non-zero circuit ID assigned by the DIS. The pseudonode ID must be locally unique to the DIS. By "locally unique", we mean that the circuit ID is distinct and different from all of the other circuit ID's used by that node at that time. The DIS is chosen based on a specified preference. This means that the node contains information defining the preference of every circuit of the node to become DIS. This information is used to choose the DIS from all available nodes on the broadcast medium.

FIG. 3 illustrates the structure of "hello" packets that are exchanged when a circuit is established between a pseudonode and other nodes on the network. The hello packet (or LAN "Intermediate System to Intermediate System Hello" or LAN IIH) allows the nodes to agree which node is to be chosen as DIS and therefore become a pseudonode. Field 301 in FIG. 3 contains information identifying the pseudonode ID. Note that IS-IS specifies that if a pseudonode ID has not been "agreed upon" as the pseudonode among other nodes on a network, the system is supposed to supply its own pseudonode ID which includes the appropriate circuit ID. The consequence of this specification is that if a node has more than 255 circuits in use and has assigned to all of them unique IDs, it cannot supply an unused circuit ID because it has run out of circuit ID's. In this circumstance, the node cannot establish additional circuits.

The IS-IS standard for broadcast media implements the following standardized behavior, which is here quoted directly from the standard itself:

When the broadcast circuit is enabled on an Intermediate system the IS shall perform the following actions.
  a) Commence sending IIH PDUs with the LAN ID field set to the concatenation of its own System ID and its locally assigned one octet Local Circuit ID.
  b) Solicit the End system configuration as described in Section 8.4.5. of RFC 1142 entitled "OSI IS-IS Intra-domain Routing Protocol" which is available from the I.E.T.F website at www.ietf.org.
  c) Start listening for ISO 9542 ISH PDUs and ESH PDUs and acquire adjacencies as appropriate. Do not run the Designated Intermediate System election process.
  d) After waiting ISIS Hello Timer *2 seconds, run the Level 1 and/or the Level 2 Designated Intermediate System election process, depending on the Intermediate system type. This shall be run subsequently whenever an IIH PDU is received or transmitted as described in 8.4.3. (For these purposes, the transmission of the system's own IIH PDU is equivalent to receiving it). If there has been no change to the information on which the election is performed since the last time it was run, the previous result can be assumed. The relevant information is
    1) the set of Intermediate system adjacency states,
    2) the set of Intermediate System priorities (including this system's) and
    3) the existence (or otherwise) of at least one "Up" End system (not including Manual Adjacencies) or Intermediate system adjacency on the circuit.

An Intermediate system shall not declare itself to be a LAN Designated Intermediate system of any type until it has at least one "Up" End system (not including Manual Adjacencies) or Intermediate system adjacency on the circuit. (This prevents an Intermediate System which has a defective receiver and is incapable of receiving any PDUs from erroneously electing itself LAN Designated Intermediate System.)

The LAN ID field in the LAN IIH PDUs transmitted by this system shall be set to the value of the LAN ID reported in the LAN IIH PDU (for the appropriate level) received from the system which this system considers to be the Designated Intermediate System. This value shall also be passed to the Update Process, as the pseudonode ID, to enable Link State PDUs to be issued for this system claiming connectivity to the pseudonode.

If this system, as a result of the Designated Intermediate System election process, considers itself to be designated Intermediate System, the LAN ID field shall be set to the concatenation of this system's own ID and the locally assigned one octet Local Circuit ID.

In accordance with the method envisioned by the present invention, each node on a LAN is initially assigned and can use any arbitrary, non-zero pseudonode ID. This status continues until it is determined that the said node is to become DIS on this LAN. When and if that happens, the arbitrary pseudonode ID is no longer used. Rather, at that point in the method, the system itself is allowed (using the IS-IS standard process) to reassign a pseudonode ID that includes a circuit ID that is indeed unique on the LAN and therefore unused. As long as the node has not been determined as DIS on the LAN, it continues to use the arbitrarily assigned pseudonode ID.

Experiments have shown that the present method works well, and acts as a tradeoff between processing speed, which suffers slightly during the relatively infrequent occasions when an arbitrary pseudonode ID has to be changed to comply to the IS-IS standard, but which gains the important ability of allowing in excess of 256 circuits while at the same time preserving interoperability with the IS-IS standard itself.

FIG. 4 is a flow diagram illustrating the process by which a pseudonode ID is assigned in accordance with the present invention. First, in step 401, a node that is establishing a circuit on the LAN sends IIH PDUs with the LAN ID field set to the concatenation of own System ID and a local non-zero, not necessarily unique circuit ID. Next, in step 403, the system waits for a designated time period, given by twice the amount established by an ISIS Hello Timer, and then performs the Designated Intermediate System (DIS) election process specified in the IS-IS standard. A test is next made in step 405, to determine if this Node is designated as Designated Intermediate System (DIS). If not, (as is normally the case), the process proceeds to step 409, in which the node continues to send the hello IIH with the current pseudonode ID and run election process regularly as described in the IS-IS standard. The process then repeats by returning to step 405. On the other hand, if a positive (YES) result is obtained in step 405, the process proceeds to step 407, in which the node assumes and uses unique (as yet unused) pseudonode ID and sends IIH PDUs with the LAN ID field set to the concatenation of its own System ID and the local unique circuit ID.

The method envisioned by the present invention can be more formally expressed as follows (in terminology similar to the terminology of the IS-IS standard, as quoted above):
  a) Commence sending IIH PDUs with the LAN ID field set to the concatenation of its own System ID and a local non-zero, not necessarily unique circuit ID.
  b) Solicit the End system configuration as described in Section 8.4.5. of RFC 1142 entitled "OSI IS-IS Intra-domain Routing Protocol" which is available from the I.E.T.F website at www.ietf.org.
  c) Start listening for ISO 9542 ISH PDUs and ESH PDUs and acquire adjacencies as appropriate. Do not run the Designated Intermediate System election process.
  d) After waiting ISIS Hello Timer *2 seconds, run the Level 1 and or the Level 2 Designated Intermediate System election process depending on the Intermediate system type. If in any point in time the decision process determines the node to be DIS for this LAN:
  e) Commence sending IIH PDUs with the LAN ID field set to the concatenation of its own System ID and a local unique circuit ID.
  f) go to step b. otherwise exhibit standard behavior.

Persons skilled in the art will understand that the present invention may be extended, and should therefore be limited only by the appended claims. For example, while the foregoing description assumed that all nodes on a LAN will use the method of the present invention, it is conceivable that only some of the nodes will use this method, and others will continue to comply strictly with the requirements of IS-IS and initially assign unique pseudonode ID's to nodes on a LAN.

What is claimed is:

1. A method of operating a local area network (LAN) containing a plurality of packet nodes operating in accordance with the IS-IS standard, including the steps of initially assigning to a circuit connecting one of said nodes to said LAN any arbitrary, non-zero circuit ID, monitoring the status of said one of said nodes to determine if said one of said nodes is designated as a Designated Intermediate System (DIS) on said LAN, and responsive to designation of said one of said nodes as DIS, changing said circuit ID of said one of said nodes to a locally unique non-zero circuit ID, wherein each of said plurality of nodes has an associated system ID, and wherein said initally assigned circuit ID is the concatenation of its associated system ID and a local non-zero, not necessarily unique circuit ID.

2. A method for assigning a pseudonode ID to an Intermediate System (IS) node on a LAN, said node operating in a message broadcast mode in accordance with the IS-IS standard, said method comprising the steps of establishing a circuit between said node and other nodes on said LAN by sending "hello" packets having a LAN ID field set to the concatenation of a System ID for said node and an arbitrary, non-zero, not necessarily unique circuit ID, waiting for a designated time period, performing a Designated Intermediate System (DIS) election process as specified in said IS-IS standard, determining if in the preceding step that said node is designated as Designated Intermediate System (DIS), and if so, thereafter sending "hello" packets with the LAN ID field set to the concatenation of said System ID and a unique circuit ID not used by any other circuit used by said node on said LAN, and if not, continuing to send said "hello" packets with the current pseudonode ID, and periodically repeating said election process.

3. The method of claim 2 wherein said designated time period is given by twice the amount established by an ISIS Hello Timer.

* * * * *